US011163642B2

(12) United States Patent
Dong et al.

(10) Patent No.: US 11,163,642 B2
(45) Date of Patent: Nov. 2, 2021

(54) METHODS, DEVICES AND COMPUTER READABLE MEDIUM FOR MANAGING A REDUNDANT ARRAY OF INDEPENDENT DISKS

(71) Applicant: EMC IP Holding Company LLC, Hopkinton, MA (US)

(72) Inventors: Jibing Dong, Beijing (CN); Jian Gao, Beijing (CN); Geng Han, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 279 days.

(21) Appl. No.: 16/582,267

(22) Filed: Sep. 25, 2019

(65) Prior Publication Data
US 2020/0133776 A1    Apr. 30, 2020

(30) Foreign Application Priority Data
Oct. 30, 2018 (CN) .......................... 201811281083.0

(51) Int. Cl.
*G06F 11/10* (2006.01)
*G06F 11/07* (2006.01)
*G06F 9/50* (2006.01)

(52) U.S. Cl.
CPC ........ *G06F 11/1084* (2013.01); *G06F 9/5016* (2013.01); *G06F 11/0793* (2013.01); *G06F 11/1092* (2013.01)

(58) Field of Classification Search
CPC .............. G06F 11/1084; G06F 9/5016; G06F 11/0793; G06F 11/1092
See application file for complete search history.

(56) References Cited

U.S. PATENT DOCUMENTS

| 5,960,169 | A | * | 9/1999 | Styczinski | .......... | G06F 11/1076 714/6.12 |
| 5,974,544 | A | * | 10/1999 | Jeffries | ............... | G06F 11/1092 710/10 |
| 2003/0135514 | A1 | * | 7/2003 | Patel | .................... | G06F 11/1076 |
| 2006/0161805 | A1 | * | 7/2006 | Tseng | .................. | G06F 11/1092 714/6.22 |
| 2009/0125680 | A1 | * | 5/2009 | Ninose | .................. | G06F 3/0631 711/114 |

(Continued)

*Primary Examiner* — Matthew M Kim
*Assistant Examiner* — Indranil Chowdhury
(74) *Attorney, Agent, or Firm* — BainwoodHuang

(57) ABSTRACT

A technique involves: in response to establishing a stripe in a Redundant Array of Independent Disks (RAID), generating first mapping information of the stripe in a block allocated for the stripe, the RAID being built based on extents obtained by dividing disks, the stripe including a first extent set, the first mapping information recording respective disk locations of the first extent set; in response to a failure occurring in a first disk where a first extent in the first extent set is located, replacing the first extent with a second extent to obtain a second extent set corresponding to the stripe; generating second mapping information of the stripe in the block, to record respective disk locations of the second extent set; and in response to the first disk being recovered from the failure, restoring data in the stripe based on the first mapping information and the second mapping information.

19 Claims, 8 Drawing Sheets

(56) References Cited

U.S. PATENT DOCUMENTS

| | | | |
|---|---|---|---|
| 2013/0173955 A1* | 7/2013 | Hallak | G06F 12/0866 714/6.24 |
| 2015/0331749 A1* | 11/2015 | O'Connor | G06F 3/0619 714/764 |
| 2020/0174900 A1* | 6/2020 | Cagno | G06F 3/0619 |

* cited by examiner

METHODS, DEVICES AND COMPUTER READABLE MEDIUM FOR MANAGING A REDUNDANT ARRAY OF INDEPENDENT DISKS

CROSS-REFERENCE TO RELATED APPLICATION

This application claims priority to Chinese Patent Application No. CN201811281083.0, on file at the China National Intellectual Property Administration (CNIPA), having a filing date of Oct. 30, 2018, and having "METHODS, DEVICES AND COMPUTER READABLE MEDIUM FOR MANAGING A REDUNDANT ARRAY OF INDEPENDENT DISKS" as a title, the contents and teachings of which are herein incorporated by reference in their entirety.

FIELD

Embodiments of the present disclosure generally relate to the field of data storage, and more specifically, to methods, devices and computer readable medium for managing a Redundant Array of Independent Disks (RAID).

BACKGROUND

A data storage system typically has a plurality of storage disks which can be organized into an array of disks. For example, a Redundant Array of Independent Disks (RAID) is a data storage virtualization technology which organizes a plurality of storage disks into a single logical unit for the purpose of data redundant backup and/or performance improvements. Each storage disk may be divided into a plurality of extents. For example, at least a part of the plurality of extents are organized into an array of disks via a storage processor. According to the degree of redundancy and level of performance as required, it may be of different types, such as RAID 0, RAID 1 . . . RAID 5 and the like.

Taking RAID 5 as an example, an RAID group may include five physical storage disks, and can be divided into a plurality of block-levelled stripes with distributed proof information. Each stripe can include five extents distributed over different physical storage disks. When a storage disk where a single extent is located therein fails, one reserved extent can be selected from reserved extents of the RAID as a spare extent, for restoring the data in the extent on the failed disk. However, data restoring typically involves a large amount of data migration operations, thereby affecting the performance of the system.

SUMMARY

In general, embodiments of the present disclosure provide methods, devices and computer readable medium for managing a Redundant Array of Independent Disks (RAID).

In a first aspect of the present disclosure, there is provided a method of managing a Redundant Array of Independent Disks (RAID). The method includes, in response to a stripe in the RAID being established, generating first mapping information of the stripe in mapping information block allocated for the stripe, the RAID being built based on a plurality of extents obtained by dividing a plurality of disks, the stripe including a first set of extents in the plurality of extents, the first mapping information recording respective locations on the plurality of disks of the first set of extents. The method also includes, in response to a failure occurring in a first disk where a first extent in the first set of extents is located, replacing the first extent in the first set of extents with a second extent in the plurality of extents to obtain a second set of extents corresponding to the stripe. The method further includes, generating second mapping information of the stripe in the mapping information block, to record respective locations on the plurality of disks of the second set of extents. In addition, the method includes, in response to the first disk being recovered from the failure, restoring data in the stripe based on the first mapping information and the second mapping information in the mapping information block.

In a second aspect of the present disclosure, there is provided a device of managing a Redundant Array of Independent Disks (RAID). The device includes a processor and a memory coupled to the processor. The memory includes instructions stored therein. The instructions, when executed by the processor, cause the device to execute acts. The acts include: in response to a stripe in the RAID being established, generating first mapping information of the stripe in mapping information block allocated for the stripe, the RAID being built based on a plurality of extents obtained by dividing a plurality of disks, the stripe including a first set of extents in the plurality of extents, the first mapping information recording respective locations on the plurality of disks of the first set of extents; in response to a failure occurring in a first disk where a first extent in the first set of extents is located, replacing the first extent in the first set of extents with a second extent in the plurality of extents to obtain a second set of extents corresponding to the stripe; generating second mapping information of the stripe in the mapping information block, to record respective locations on the plurality of disks of the second set of extents; and in response to the first disk being recovered from the failure, restoring data in the stripe based on the first mapping information and the second mapping information in the mapping information block.

In a third aspect of the present disclosure, there is provided a computer readable medium. The computer readable medium stores thereon computer readable instructions. The computer readable instructions, when executed, cause a device to execute any step of the method as described in the first aspect of the present disclosure.

This Summary is provided to introduce a selection of concepts in a simplified form that are further described below in the Detailed Description. This Summary is not intended to identify key features or essential features of the claimed subject matter, nor is it intended to limit the scope of the claimed subject matter.

BRIEF DESCRIPTION OF THE DRAWINGS

The above and other objectives, features, and advantages of the present disclosure will become more apparent, through the following detailed description of the example embodiments of the present disclosure with reference to the accompanying drawings, in which the same reference symbols generally refer to the same elements.

Throughout the drawings, the same or similar reference symbols refer to the same or similar elements.

DETAILED DESCRIPTION OF EMBODIMENTS

Figure 1:
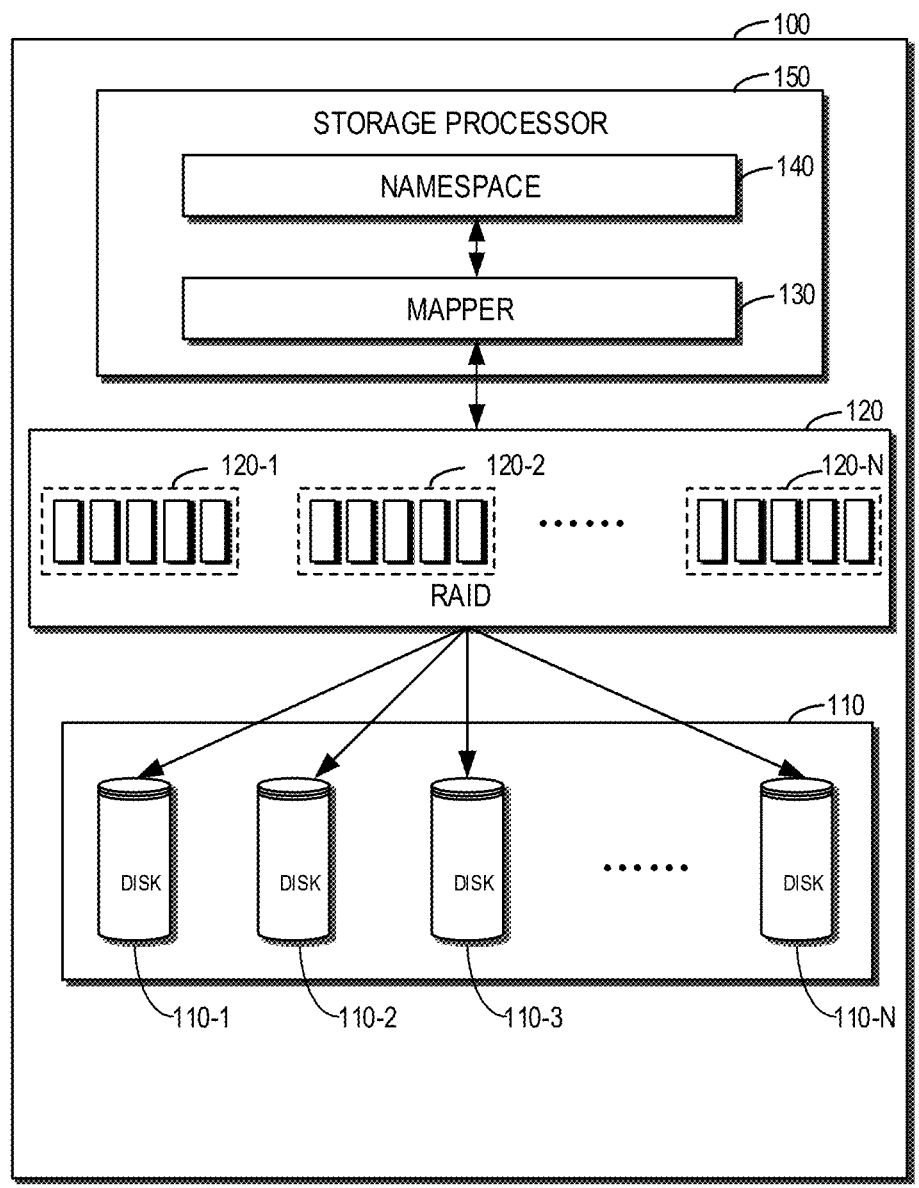
FIG. 1 illustrates an architecture diagram of a storage system according to an embodiment of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in detail with reference to the accompanying drawings. Although the drawings illustrate preferred embodiments of the present disclosure, it would be appreciated that the present disclosure may be implemented in various manners but cannot be construed as being limited by the embodiments illustrated herein. On the contrary, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment." The terms "first," "second," and the like may refer to different or the same objects. Other definitions, either explicit or implicit, may be included below.

In a conventional RAID, if failure occurs in a storage disk where a single extent of the RAID is located, a data storage system will start an operation of data restoring. In the operation of data restoring, the data storage system is required to execute data migration, based on information of the extent location provided by the mapping information block of the RAID. The inventors realize that, when "glitch" (the so-called "glitch" refers to that one or more storage disks change repeatedly between a failure state and a normal state, which is often caused by a circuit problem, loose plugging or the like) occurs in storage disks, mapping information items in the mapping information block will all be occupied in an instant. Although the problem can be solved by increasing the number of the mapping information items, this costs more storage resources. In other words, there is a contradiction between the reliability of the system and the storage resources used. Furthermore, the efficiency of data restoring is associated with the amount of data to be migrated. The existing method of data restoring involves a large amount of data migration operations all the time, thereby affecting the efficiency of data restoring.

The embodiments of the present disclosure provide a solution of managing an RAID. The solution can ensure reliability of a storage system. Without increasing the number of mapping information items, the solution can handle the case that all of the mapping information items have been used due to storage disk "glitch" or the like. In addition, the solution can reduce the data migration operations and thus improve the performance of the system.

FIG. 1 illustrates an architecture diagram of a storage system 100 according to an embodiment of the present disclosure. As shown in FIG. 1, the storage system 100 may include storage disks 110 and a storage processor 150. It would be appreciated that the structure and functionality of the storage system 100 as shown in FIG. 1 are only provided as an example, without implying any limitation to the scope of the present disclosure. The embodiments of the present disclosure can be embodied in different structures and/or functionalities.

As shown in FIG. 1, the storage disks 110 include a plurality of storage disks 110-1, 110-2 ... 110-N (where N is a positive integer). As used herein, the "storage disk" may refer to any non-volatile storage medium currently known or to be developed in the future, such as a magnetic disk, an optical disk, a Solid-State Disk (SSD) or the like. In the context, the magnetic disk is described as an example for the storage disk. However, it would be appreciated that this is only provided an example, without implying any limitation to the scope of the present disclosure.

Each storage disk 110 may be divided into a plurality of extents. It would be appreciated that the size of the extent can be determined according to needs. For example, the size of the extent may be set in a GB magnitude (for example, one extent is set to 4 GB). The storage processor 150 can organize at least a part of the plurality of extents into a disk array 120. The disk array 120, for example, may be a Redundant Array of Independent Disks (RAID) which generally combines a plurality of physical storage units into a logical storage unit out of the purpose of data redundancy backup and/or performance improvements. According to the required degree of redundancy and level of performance, it may be of different types, such as RAID 0, RAID 1 ... RAID 5 and the like.

The disk array 120 may be comprised of a plurality of stripes 120-1, 120-2 ... 120-N (where N is a positive integer). Each stripe may include a data extent for storing user data and a proof extent for storing proof information. Taking the RAID 5 with a 4D+1P layout as an example, each stripe may include four data extents (i.e., "4D") and one proof extent (i.e., "1P"). In the following depiction, the 4D+1P RAID 5 is described as an example of the disk array 120. However, it would be appreciated that this is provided only for illustration, without implying any limitation to the scope of the present disclosure. The embodiments of the present disclosure can be applied to other types of RAIDs having other layouts.

The storage processor 150 may include a mapper 130 and a namespace 140. The mapper 130 is used to provide a mapping relation between a physical storage location occupied by the RAID and a logical location used by the namespace 140. The namespace 140 implements mapping from the logical location to the physical location by calling API of the mapper 130.

When writing or reading data, a user of the storage system 100 sends an instruction on writing or reading data to the namespace 140. The namespace 140 sends the processed instruction to the mapper 130. The mapper 130 searches a location where the data should be written into or read from, using an internal mapping relation, and sends the location to the RAID 120. The RAID 120 processes the user's instruction on writing or reading data, using the location.

Figure 2:
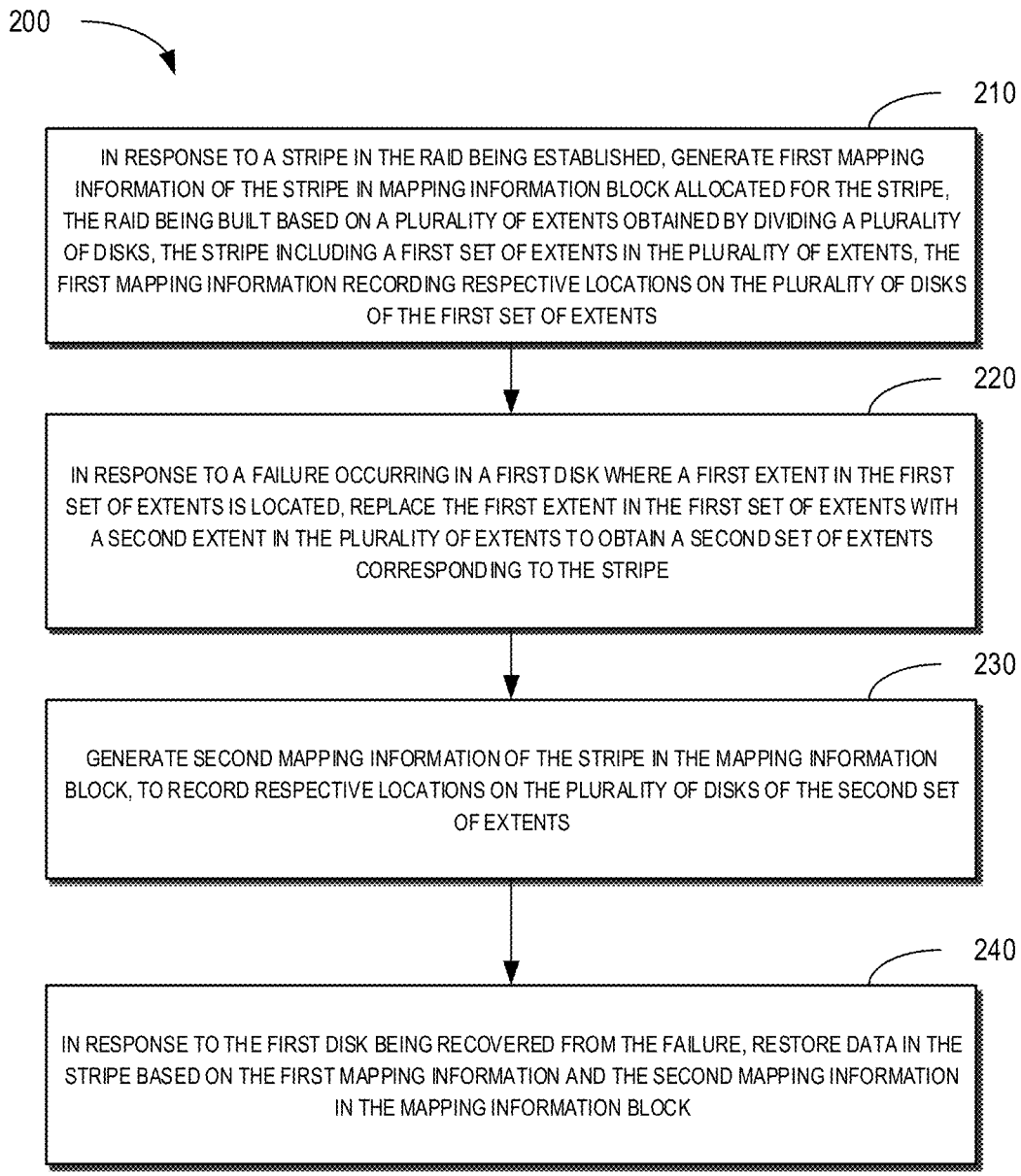
FIG. 2 illustrates a flowchart of a method for managing an RAID according to an embodiment of the present disclosure.

FIG. 2 illustrates a flowchart of a method 200 for managing the RAID 120 according to an embodiment of the present disclosure. The method 200, for example, may be executed by the storage processor 150 as shown in FIG. 1. It would be appreciated that the method 200 may further include additional acts not shown and/or may skip the acts as shown, and the scope of the present disclosure is not limited in the aspect. The method 200 will be described below in detail with reference to FIGS. 1 to 7.

At block 210, in response to a stripe (for example, a stripe 120-1) in the RAID 120 being established, generating mapping information item 501 (which is also referred to as "first mapping information" in the context) of the stripe 120-1 in mapping information block 500 allocated for the stripe 120-1. The RAID is built based on a plurality of extents obtained by dividing the storage disks 110. The stripe 120-1 includes a first set of extents in the plurality of extents. The mapping information item 501 records respective locations D0 to D4 on the storage disks 110 of the first set of extents.

Figure 3:
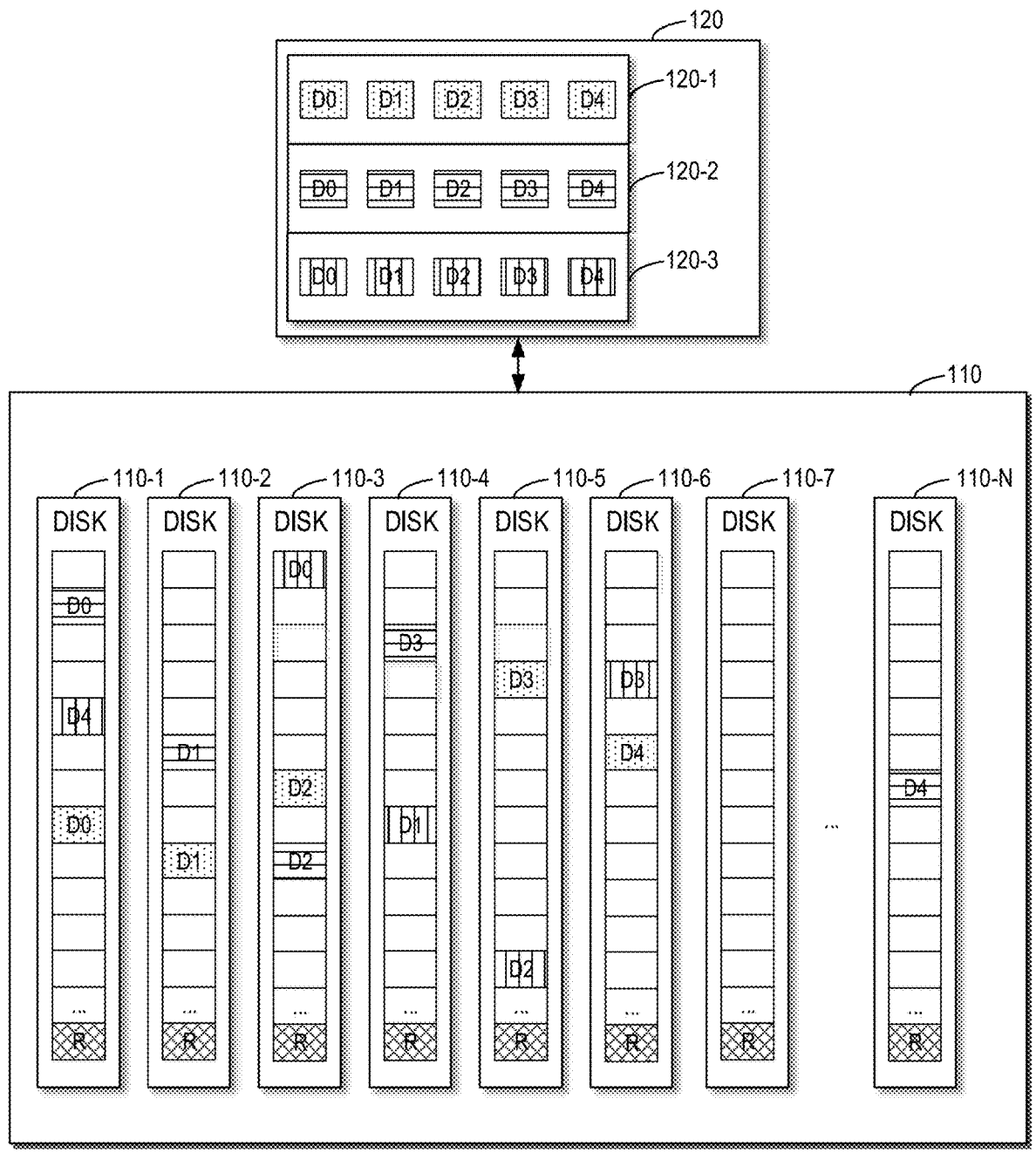
FIG. 3 illustrates a schematic diagram of an example layout of an RAID according to an embodiment of the present disclosure.

In some embodiments, as shown in FIG. 3, the RAID 120 according to an embodiment of the present disclosure includes three stripes 120-1, 120-2 and 120-3. FIG. 3 illustrates an example of RAID 120 built base on a plurality of storage disks 110 as shown in FIG. 1. As shown in FIG. 3, for example, an RAID 5 with 4D+1P layout is established over N disks 110-1 to 110-N, where N is greater than 5. In the example as shown in FIG. 3, D0 to D3 represent data extents for storing user data, respectively, and D4 represents a proof extent for storing proof information. When an RAID stripe (including D0 to D3 and D4) is established, five extents may be selected randomly from five different disks. Therefore, the user data and the proof information will be distributed evenly into all of the disks. Moreover, in order to ensure reliability of the RAID, some reserved extents are reserved on the disks 110, which are represented by, for example, R. When a certain disk in the disks 110 fails, these reserved extents can be used to restore the RAID stripe(s) associated with the failure, thereby avoiding data loss.

In some embodiments, an I/O request for the storage system 100 may be an I/O request for a certain stripe (for example, the stripe 120-1, 120-2 or 120-3) as shown in FIG. 3. For example, the storage processor 150 may maintain the mapping relation between the strips and the disks 110, and may determine one or more disks 110 involved in the I/O request, based on the mapping relation. Taking the stripe 120-1 as an example, the request for the stripe 120-1 involves the disks 110-1, 110-2, 110-3, 110-5 and 110-6.

Taking the stripe 120-2 as an example, the request for the stripe 120-2 involves the disks 110-1, 110-2, 110-3, 110-4 and 110-N.

Figure 4:
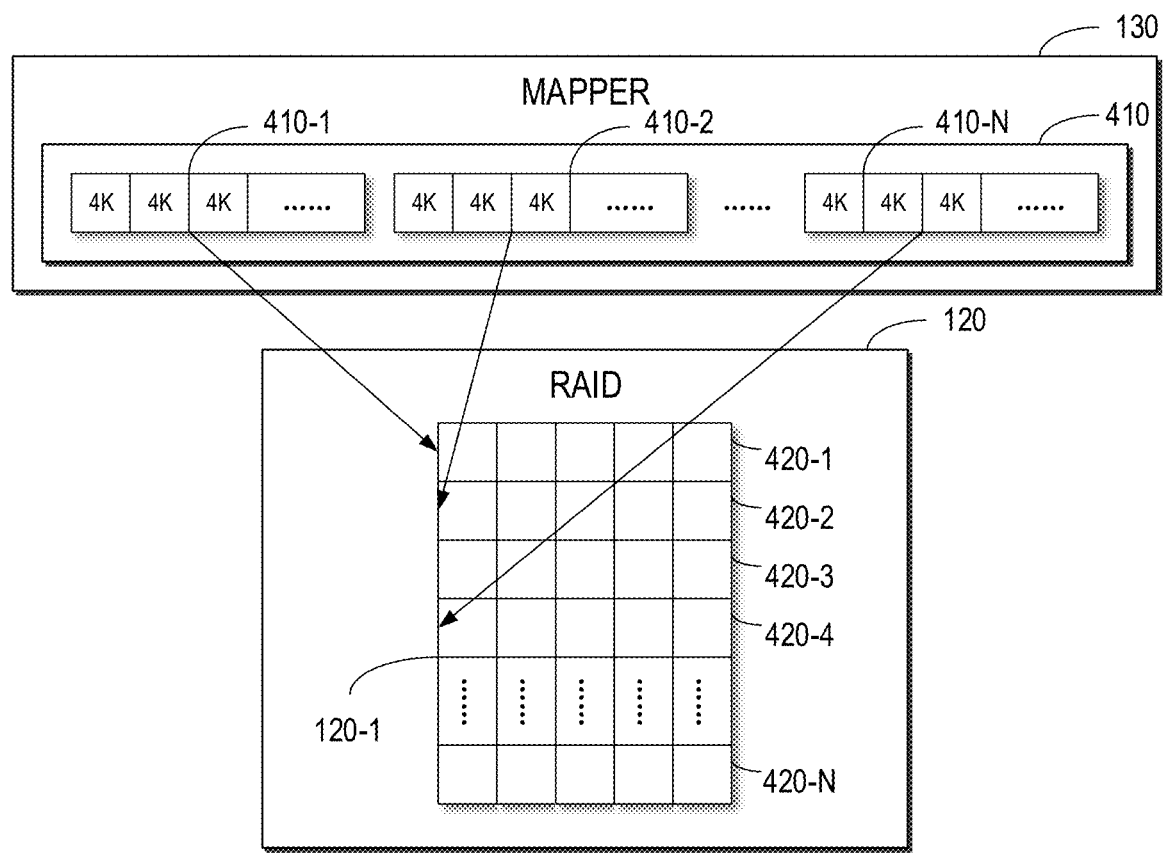
FIG. 4 illustrates a schematic diagram of a relation between a mapper and an RAID of a storage system according to an embodiment of the present disclosure.

In some embodiments, there may be a relation, as shown in FIG. 4, between the mapper 130 and one example stripe 120-1 in the RAID 120 according to embodiments of the present disclosure. As shown in FIG. 4, the mapper 130 may include a plurality of virtual large blocks (VLBs) 410-1, 410-2 . . . 410-N (which are collectively referred to as "virtual large blocks 410", where N is a positive integer). The mapper 130 writes data into the RAID 120 via the virtual large blocks 410. It would be appreciated that the number of virtual large blocks 410 included in the mapper 130 can be set or created according to needs. In each virtual large block, the mapper 130 organizes data in the form of "data page." For example, each "data page" is 4K in size. The number of "data pages" in each virtual large block can also be set according to needs. For example, each virtual large block includes 512 "data pages." Hence, in the case that each "data page" is 4K in size, each virtual large block is 2M. In order to organize a large number of "data pages" in the mapper 130, a tree data structure (for example, a three-layer tree data structure) may be employed.

As shown at the lower part of FIG. 4, corresponding to the virtual large blocks 410 in the mapper 130, the stripe 120-1 in the RAID 120 is divided into a plurality of physical large blocks (PLBs) 420-1, 420-2, 420-3, 420-4 . . . 420-N (which are collectively referred to as "physical large blocks 420", where N is a positive integer). In order to enable the virtual large blocks 410 and the physical large blocks 420 to correspond to each other, each virtual large block is equal to each physical large block in size. In addition, for each virtual large block, the mapper 130 is required to record its mapping relation with the corresponding physical large block. Based on the recorded mapping relation, the mapper 130 can determine the location in the RAID 120 of data written from the virtual large block 410 into the physical large block 420 of each time.

For example, based on the correspondence relation between the mapper 130 and the RAID 120 as shown in FIG. 4, the storage system 100 may store data in the following manner. First, a user writes data into cache of the system. Subsequently, the cache writes the data into the mapper 130. The mapper 130 creates therein mapping information of each "data page" and encapsulates a certain number (for example, 512) of "data pages" into a virtual large block 410-1. Then, the mapper 130 writes the virtual large block 410-1 into the physical large block 420-1 of the stripe 120-1 in the RAID 120. According to the above data storage mechanism, when there is new data to be written, the mapper 130 may create virtual large blocks 410-2, 410-3 . . . and the like. Correspondingly, the virtual large blocks 410-2, 410-3 and the like are written into the corresponding physical large block in the stripe 120-1 in the RAID 120. It would be appreciated that the correspondence relation between the virtual large blocks 410 and the physical large blocks 420 in FIG. 4 may be established according to needs. For example, the data in the virtual large block 410-N may be written into the physical large block 420-4.

Referring to FIG. 2 again, in some embodiments, at block 220, in response to a failure of a disk (for example, the disk 110-3 where the extent D2 of the stripe 120-1 is located, as shown in FIG. 3) where a first extent (for example, an extent located at D2) in the first set of extents (for example, the locations of which are D0-D4, respectively) is located, replacing the first extent in the first set of extents with a second extent (for example, the extent located at S1) in the plurality of extents to obtain a second set of extents (locations of which are D0, D1, S1, D3 and D4, respectively) corresponding to the stripe.

Figure 5:
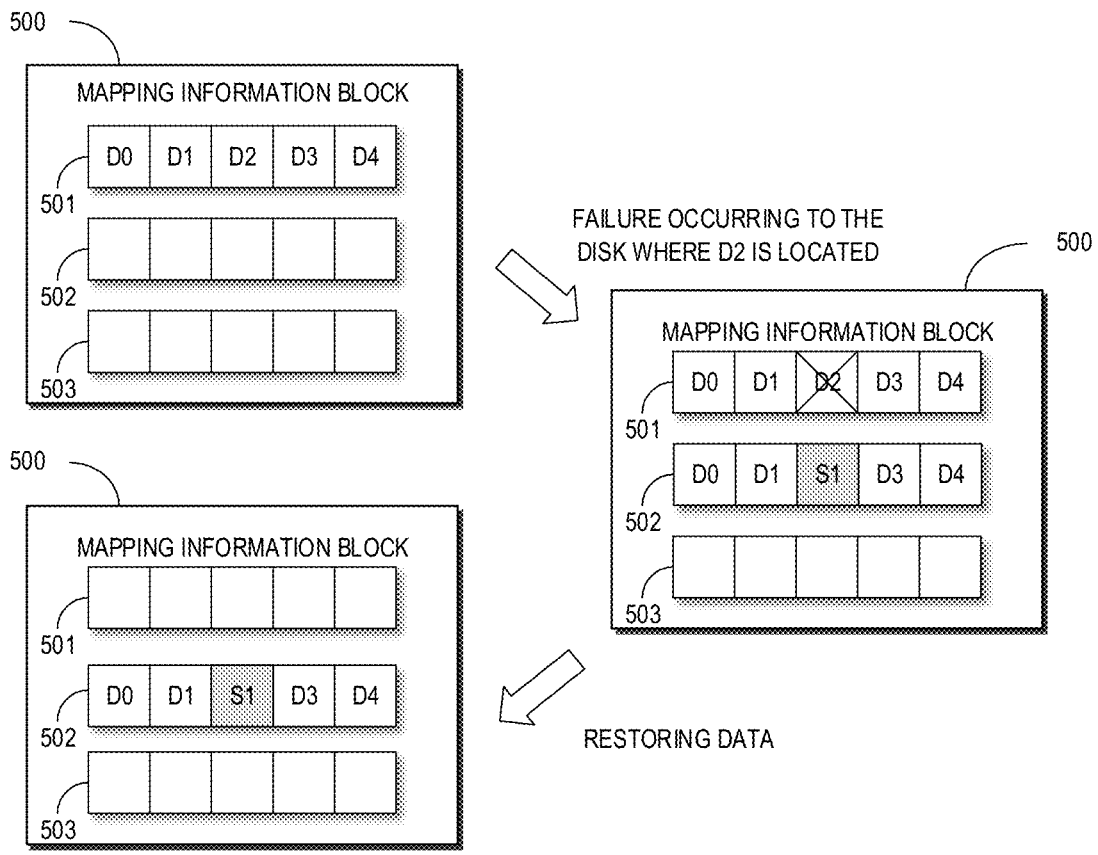
FIG. 5 illustrates a schematic diagram of a method of restoring the data in a stripe using mapping information of the stripe according to an embodiment of the present disclosure.

In some embodiments, the second set of extents may be obtained in the manner as shown in FIG. 5. As shown in FIG. 5, the RAID 120 creates mapping information block 500 for each stripe therein. The mapping information block 500 may include a certain number of mapping information items. For example, the mapping information block 500 may include three mapping information times 501, 502 and 503.

As shown in FIG. 5, for RAID 5, each of mapping information items 501, 502 and 503 includes five mapping information sub-items. Each mapping information sub-item records respective locations on the storage disks 110 of the five extents of a stripe. For example, for the stripe 120-1, the mapping information item 501 records therein the mapping information, i.e., respective locations D0 to D4 of the five extents of the stripe 120-1. In addition to the locations, the mapping information may also record other information, such as the type of the RAID 120, the number of the storage disks 110, and the like.

Theoretically, only one mapping information item 501 is required to record respective locations on the storage disks 110 of the five extents of a stripe, but in order to record the location of a spare extent after a failure of a disk where one of the five extents of one stripe is located, a plurality of mapping information items (for example, three mapping information items 501, 502 and 503) may be provided in some embodiments. It would be appreciated that the number of mapping information items may be reasonably set according to actual needs and storage resources. Three mapping information items are described here as an example, but should not be construed as limiting the present disclosure.

For example, when a stripe 120-1 is established, the RAID 120 records simultaneously respective locations D0 to D4 on the storage disks 110 of the five extents of the stripe 120-1, in the mapping information item 501 in the mapping information block 500 for the stripe 120-1, thereby forming "first mapping information." At this time, the mapping information items 502 and 502 have not been used. In this case, the RAID 120 writes data into the stripe 120-1 or reads data from the respective locations, based on the first mapping information. Moreover, after writing data is completed, the RAID 120 returns the first mapping information back to the mapper 130. As such, the mapper 130 records correspondingly that the data are written based on the first mapping information.

In a case of a failure of the disk where the first extent is located, for example, the disk where the extent at D2 is located, the RAID 120 selects immediately an extent from the reserved extents, as a spare extent (which is also referred to as "second extent" herein). For example, the RAID 120 takes the extent at the location S1 on the storage disks 110 as the second extent. The RAID 120 replaces the extent corresponding to D2 with the second extent (located at S1), thereby obtaining a new set of extents (which is also referred to as "second set of extents" herein) corresponding to the stripe 120-1, where locations of respective extents are D0, D1, S0, D3 and D4.

In some embodiments, in a case of a failure of the disk where the first extent is located, for example, the disk where the extent at D2 (see FIG. 3, for example, the disk 110-3) is located, the RAID 120 immediately selects an extent from a plurality of extents (for example, the reserved extents in the RAID 120) as a second extent. In these embodiments, in order to ensure that the spare extent corresponding to S1 can operate normally, the disk where the spare extent is located may be one of the storage disks 110, different from the disk 110-3.

In some further embodiments, the second extent may also be located on one of the disks 110, different from the disks where the first set of extents are located. For example, in the example as shown in FIG. 3, the second extent is located on a disk, other than the disks 110-1, 110-2, 110-3, 110-5 and 110-6. In this way, the RAID 120 can utilize the storage disks 110 as evenly as possible, to prolong the service life of the storage disks 110. In addition, the dispersed distribution of a plurality of extents is also advantageous to avoid simultaneous failure of disks where the extents are located.

Returning to FIG. 2, at block 230, in some embodiments, generating mapping information item 502 (which is also referred to as "second mapping information" herein) of a stripe (for example, the stripe 120-1) in mapping information block (for example, the mapping information block 500), to record respective locations on the storage disks 110 of the second set of extents. For example, the respective locations on the storage disks 110 of the second set of extents are D0, D1, S1, D3 and D4, respectively.

For example, the RAID 120 records the location S1 (which is also referred to as "second location" herein) of the second extent into a corresponding mapping information sub-item of the mapping information item 502, i.e., the RAID 120 updates the previous location D2 (which is also referred to as "first location" herein) with the second location S1. Meanwhile, for those extents located on the disks not failing, the locations D0, D1, D3 and D4 thereof are written into respective mapping information sub-items of the mapping information item 502 in a one-to-one correspondence manner, thereby forming "second mapping information." At this time, the two mapping information items 501 and 502 in the mapping information block 500 of the stripe 120-1 are both utilized. In this case, the RAID 120 writes new data into the stripe 120-1 based on the locations recorded in the mapping information item 502. As seen above, the RAID 120 always writes data into the stripes, based on those mapping information items whose corresponding extents are not located on the failed disk. In addition, after writing new data is completed, the RAID 120 returns the second mapping information back to the mapper 130. As such, the mapper 130 records correspondingly that the data are written based on the second mapping information.

Subsequently, when a user initiates an operation of reading data, the mapper 130 searches, through the records, the mapping information providing the location based on which particular data are written. The mapper 130 notifies the RAID 120 of the search result (i.e., the first mapping information or the second mapping information). Thereby, the RAID 120 can read data from the corresponding extents, based on the first mapping information (which is recorded in the mapping information item 501) or the second mapping information (which is recorded in the mapping information item 502). It would be appreciated that the mapper 130 may store the recorded mapping information in multiple manners, for example, storing the mapping information in the virtual large blocks 410 as shown in FIG. 4.

Returning to FIG. 2, at block 240, in response to the failed disk (for example, the disk 110-3) recovering from failure, restoring the data in a stripe (for example, the stripe 120-1) based on the first mapping information (for example, the information recorded in the mapping information item 501) and the second mapping information (for example, the information recorded in the mapping information item 502).

In some embodiments, for example as shown in FIG. 5, after a period of time (for example, after 5 minutes) since the failure of the disk (for example, the disk 110-3) where the extent at D2 is located, if the failed disk 110-3 has not been recovered yet, the mapper 130 will start restoring data in the stripe 120-1.

The method of restoring the data is to copy the data previously written into the extent at D2 according to the first mapping information into the extent at S1. In addition, the mapper 130 is further required to modify the internal record of the above data corresponding to the first mapping information to the second mapping information. That is, the mapper 130 modifies the internal record to that the above data is written into the RAID 120 based on the second mapping information.

When the data restoring procedure is completed, data previously located in the extent at D2 have been written into the extent at S1. The mapper 130 may notify the RAID 120 to remove the first mapping information, i.e., to remove the information recorded in the mapping information item 501. Thereafter, the RAID 120 writes new data to the stripe 120-1, based on the locations (i.e., D0, D1, S1, D3 and D4) recorded in the mapping information item 502.

In the case that the "glitch" occurs in the storage disks 110, it can be envisioned that, prior to completion of the data restoring procedure, the mapping information item 501 is still occupied, i.e., it still preserves the mapping information therein. If the disk where the extent at S1 is located also fails at this time, the RAID 120 will repeat the previous procedure. In other words, once again the RAID 120 selects immediately an extent from the reserved extents as a new spare extent. In this case, the RAID 120 records the location of the new spare extent in the corresponding mapping information sub-item of the mapping information item 503. In this case, three mapping information items 501, 502 and 503 in the mapping information block 500 are all utilized. If disk failure occurs again at this time, there is no available mapping information item. Furthermore, the above method of data restoring involves a large amount of data migration operations all the time, thereby causing a low efficiency for data restoring and hence affecting the performance of the system.

Figure 6:
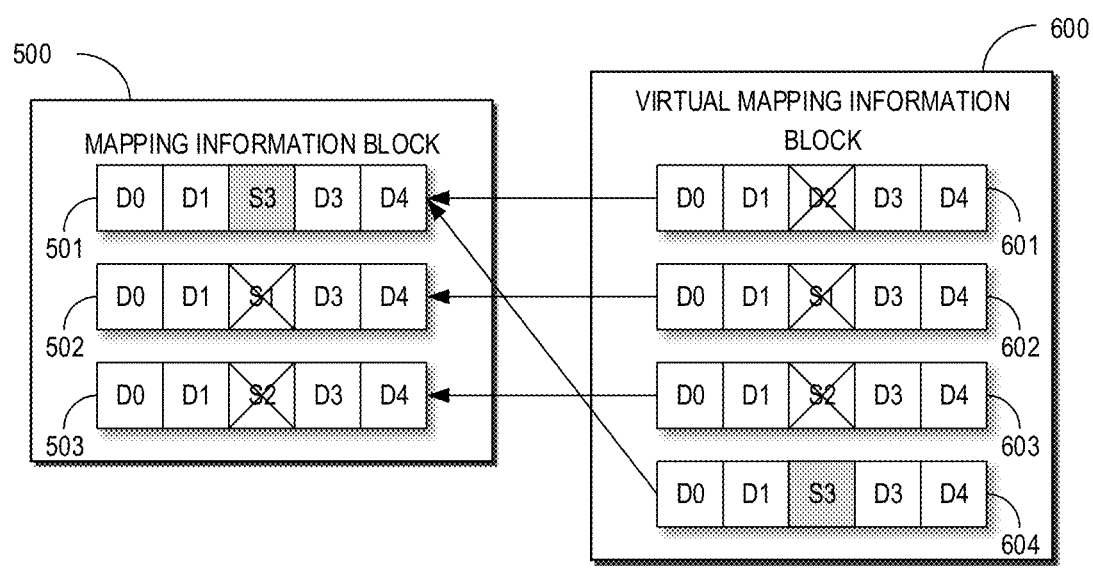
FIG. 6 illustrates a schematic diagram of mapping information of a stripe according to an embodiment of the present disclosure, in a case that a storage disk is failed.
Figure 7:
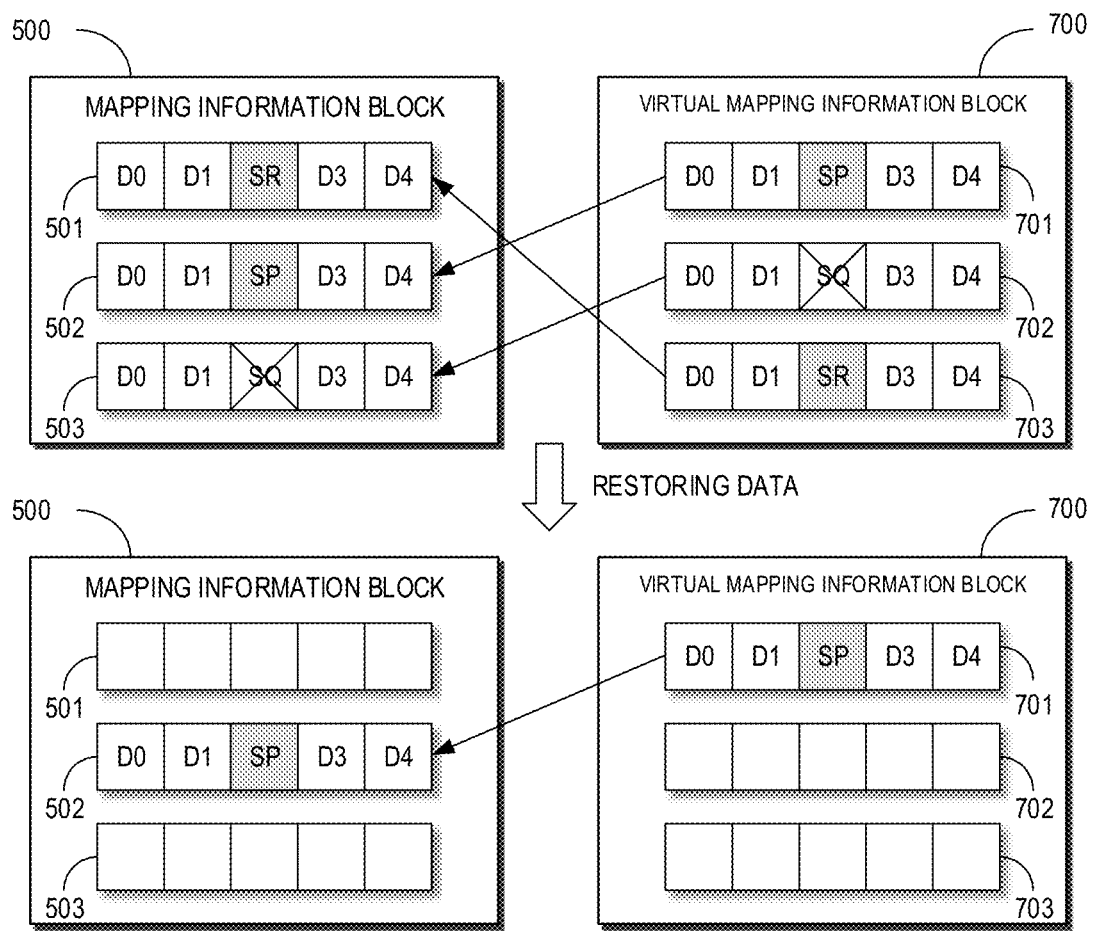
FIG. 7 illustrates a schematic diagram of a further method of restoring the data in a stripe using mapping information of the stripe according to an embodiment of the present disclosure.

FIG. 6 illustrates a schematic diagram of the mapping information block 500 and the virtual mapping information block 600 of the stripe 120-1 according to an embodiment of the present disclosure, in the case that the "glitch" occurs in the storage disks 110. FIG. 7 illustrates a schematic diagram of a further method of restoring the data according to an embodiment of the present disclosure. The method will be described with reference to FIGS. 6 and 7.

In general, in order to solve the problem that the three mapping information items 501, 502 and 503 of the mapping information block 500 are all occupied in the case that the "glitch" occurs in the storage disks 110, the embodiments of the present disclosure provide a virtual mapping information block 600. Unlike the mapping information block 500, the virtual mapping information block 600 is not stored in the RAID 120, but in other portions of the storage system 100, for example, the mapper 130. In addition, the number of the virtual mapping information items 601, 602, 603, 604 . . . in the virtual mapping information block 600 is not restricted by the number of mapping information items in the mapping information block 500, and can be set more according to needs. Moreover, each of the virtual mapping information items 601, 602, 603 and 604 includes five mapping information sub-items. Each mapping information sub-item records the respective locations on the storage disks 110 of the five extents of a stripe, respectively.

For example, when a stripe 120-1 is established, the RAID 120 records respective locations D0 to D4 on the storage disks 110 of the five extents of the stripe 120-1, in the mapping information item 501 in the mapping information block 500 for the stripe 120-1. Correspondingly, the mapper 130 generates a virtual mapping information item 601 in the virtual mapping information block 600. The locations D0 to D4 are also recorded in the virtual mapping information item 601, thereby forming the first mapping information. In this case, the RAID 120 writes data into the stripe 120-1 or reads data from the respective locations, based on the locations D0 to D4 (i.e., "first mapping information") recorded in the virtual mapping information item 601 of the virtual mapping information block 600. The extents corresponding to D0 to D4 are also referred to as "first set of extents."

As the communication between the RAID 120 and the mapper 130, for example, after writing data is completed, the RAID 120 returns the first mapping information back to the mapper 130. Based on the correspondence relation between the mapping information items in the mapping information block 500 and the virtual mapping information items in the virtual mapping information block 600, the mapper 130 records that the data are written based on the virtual mapping information item 601.

In a case of a failure of a disk where an extent in the first set of extents is located (for example, a failure of the disk 110-3 where the extent corresponding to D2 is located, in which the extent corresponding to D2 is referred to as "first extent" herein), replacing the first extent in the first set of extents with a second extent (for example, the extent at S1) in the reserved extents to obtain a second set of extents (locations of which are D0, D1, S1, D3 and D4, respectively) corresponding to the stripe 120-1.

After obtaining the second set of extents, a virtual mapping information (which is also referred to as "second mapping information" herein) is generated in the virtual mapping information block 600, to record respective locations on the plurality of disks (for example, D0, D1, S1, D3 and D4) of the second set of extents.

In some embodiments, the storage system 100 (for example, the storage system 100 with the aid of the RAID 120) can determine the location S1 (which is also referred to as "second location" herein) on the storage disks 110 of the spare extent. The RAID 120 may also notify the mapper 130 of the location S1 of the spare extent. The mapper 130 generates a new virtual mapping information item 602. The storage system 100 (for example, the storage system 100 with the aid of the mapper 130) can update the location D2 recorded in the virtual mapping information item 601 by using the location S1, to generate the virtual mapping information item 602. In this way, the locations recorded in the virtual mapping information item 602 are D0, D1, S1, D3 and D4, respectively. In this case, the mapping information block 500 still operates in the preceding manner. Therefore, the locations of the extents recorded in the mapping information item 502 are also D0, D1, S1, D3 and D4.

It would be appreciated that the example with respect to the location of the second extent on the storage disks 110, as described above, also applies to the embodiment. For example, in order to ensure that the spare extent corresponding to S1 can operate normally, the disk where the spare extent is located may be one of the storage disks 110, different from the disk 110-3. For example, the second extent may also be located on one of the storage disks 110, different from the disks where the first set of extents are located.

When new data are written into the RAID 120, the RAID 120 writes data into the stripe 120-1, based on the locations recorded in the mapping information item 502. As the communication between the RAID 120 and the mapper 130, for example, after writing data is completed, the RAID 120 returns the second mapping information back to the mapper 130. Based on the correspondence relation between the mapping information items in the mapping information block 500 and the virtual mapping information items in the virtual mapping information block 600, the mapper 130 records that the data are written based on the virtual mapping information item 602.

Thereafter, in the case that the disk where the extent corresponding to S1 fails, once again the RAID 120 will immediately select an extent from the reserved extents as the spare extent. For example, the RAID 120 records the location S2 of the spare extent in the corresponding mapping information sub-item of the mapping information item 503. Moreover, the RAID 120 notifies the mapper 130 of the location S2 of the spare extent. The mapper 130 generates a new virtual mapping information item 603 again. In this case, the locations of extents recorded in the mapping information item 503 are D0, D1, S2, D3 and D4, respectively. Likewise, the locations of extents recorded in the virtual mapping information item 603 are D0, D1, S2, D3 and D4, respectively.

When new data are written into the RAID 120, the RAID 120 writes data into the stripe 120-1, based on the locations recorded in the mapping information item 503. As the communication between the RAID 120 and the mapper 130, for example, after writing data is completed, the RAID 120 returns the updated mapping information (the information recorded in the mapping information item 503) back to the mapper 130. Based on the correspondence relation between the mapping information items in the mapping information block 500 and the virtual mapping information items in the virtual mapping information block 600, the mapper 130 records that the data are written based on the virtual mapping information item 603.

Subsequently, in the case that the disk where the extent corresponding to S2 fails, once again the RAID 120 will immediately select an extent from the reserved extents as the spare extent. For example, once again the RAID 120 records the location S3 of the spare extent in the corresponding mapping information sub-item of the mapping information item 501. In this case, the location D2 recorded initially in the corresponding mapping information sub-item of the mapping information item 501 is rewritten as S3. In other words, the RAID 120 reuses the mapping information item 501 having been generated. Moreover, the RAID 120 notifies the mapper 130 of the location S3 of the spare extent. The mapper 130 generates a new virtual mapping information item 604 again. In this case, the locations of extents recorded in the mapping information item 501 are D0, D1, S3, D3 and D4, respectively. Likewise, the locations of extents recorded in the virtual mapping information item 604 are D0, D1, S3, D3 and D4, respectively.

When new data are written into the RAID 120, the RAID 120 writes data into the stripe 120-1, based on the locations recorded in the mapping information item 501. As the communication between the RAID 120 and the mapper 130, for example, after writing data is completed, the RAID 120 returns the updated mapping information (the information recorded in the mapping information item 501) back to the mapper 130. Based on the correspondence relation between the mapping information items in the mapping information block 500 and the virtual mapping information items in the virtual mapping information block 600, the mapper 130 records that the data are written based on the virtual mapping information item 604.

Thereafter, if failure occurs in the disk where the extent corresponding to S3 is located, the storage system 100 will rewrite the three mapping information items 501, 502 and 503 of the mapping information block 500 in turn in the above manner, and generate new virtual mapping information items sequentially. In this way, the storage system 100 cures the deficiency that the mapping information is not usable when the mapping information items in the existing RAID 120 are all occupied. According to the technical solution of the embodiments of the present disclosure, the virtual mapping information items 601, 602, 603, 604 . . . are generated in the portions of the storage system 100, other than the RAID 120, according to the actual needs. Therefore, the virtual mapping information block 600 will not occupy the storage resources in the RAID 120. As a result, the existing contradiction between the number of the mapping information and the storage resources is solved.

In some embodiments, for example, referring to FIGS. 6 and 7, the storage system 100 needs several variables for representing information relating to the virtual mapping information block 600, in order to execute data read and write operations using the virtual mapping information block 600. For example, a variable "current mapping information item" (currentP) represents a serial number of a virtual mapping information item latest generated; a variable "primary mapping information item" (primaryP) represents a serial number of a virtual mapping information item the corresponding extents of which can operate normally and include valid data; and a mark bit (bitmask) represents, in a hexadecimal number, that mapping information sub-item at the corresponding location in the virtual mapping information item has been updated. Both the variable "current mapping information item" (currentP) and the variable "primary mapping information item" (primaryP) may be increased from the serial number 0.

For example, in the example as shown in FIG. 6, the mapper 130 has generated a virtual mapping information item 604, and the mapping information sub-item where D2 is located has been updated. In this case, the "current mapping information item" (currentP) is 3; the variable "primary mapping information item" (primaryP) is 3; and the mark bit (bitmask) is 0x04. If the mapping information sub-item where D0 is located has been updated, the mark bit (bitmask) is 0x01. If the mapping information sub-item where D1 is located has been updated, the mark bit (bitmask) is 0x02. Using the above variables, the mapper 130 and the RAID 120 can exchange information therebetween, so as to implement data read and write operations.

In this embodiment, the correspondence relation between the mapping information block 500 and the virtual mapping information block 600 can be implemented through a certain algorithm. For example, in the case that the mapping information block 500 includes three mapping information items 501, 502 and 503, the virtual mapping information items 601, 602, 603, 604 . . . may be assigned with serial numbers 0, 1, 2, 3 . . . , respectively, and the mapping information items 501, 502 and 503 may be assigned with the serial numbers 0, 1 and 2, respectively. In this case, a serial number of a virtual mapping information item may be calculated with modulo operation by "3" so as to obtain the corresponding serial number of mapping information item. For example, the serial number of the virtual mapping information item 604 is 3. When modulo operation by "3" is executed for 3, 0 is obtained. The serial number of the mapping information item 501 is 0. Therefore, the virtual mapping information item 604 corresponds to the mapping information item 501 (as shown in FIG. 6).

The specific method of data restoring using the virtual mapping information block 600 will be described below, with reference to FIG. 7. In some embodiments, for example, referring to FIG. 7, three virtual mapping information items 701, 702 and 703 are shown in the virtual mapping information block 700. For example, the procedure for generating the three virtual mapping information items 701, 702 and 703 will be described below.

First, the virtual mapping information item 701 is generated. At this time, values of the variables currentP and primaryP are the serial numbers (which is P, for example) corresponding to the virtual mapping information item 701. The variable bitmask is 0x00. The locations recorded in the virtual mapping information item 701 are D0, D1, SP, D3 and D4, respectively.

After a failure of a disk where the extent at the location SP in the virtual mapping information item 701 is located, the storage system 100 selects a reserved extent located at the location SQ on the storage disks 110 as the spare extent. The storage system 100 generates the virtual mapping information item 702. At this time, the values of the variables currentP and primaryP are the serial number (which is Q, for example) corresponding to the virtual mapping information item 702. The variable bitmask is 0x04. The locations recorded in the virtual mapping information item 702 are D0, D1, SQ, D3 and D4, respectively.

Subsequently, after a failure of the disk where the extent at the location SQ in the virtual mapping information item 702 is located, the storage system 100 selects the reserved extent located at the location SR on the storage disks 110 as the spare extent. The storage system 100 generates the virtual mapping information item 703. At this time, the values of the variables currentP and primaryP are the serial number (which is R, for example) corresponding to the virtual mapping information item 703. The variable bitmask is 0x04. The locations recorded in the virtual mapping information item 703 are D0, D1, SR, D3 and D4, respectively.

In the above procedure, the locations recorded in the three mapping information items 501, 502 and 503 of the mapping information block 500 are changed accordingly. After the storage system 100 generates the virtual mapping information item 703, the states of the mapping information items 501, 502 and 503 are shown in the mapping information block 500 at the upper left part of FIG. 7.

During the "glitch" of the storage disks 110, the following events occur. After the storage system 100 generates the virtual mapping information item 703, and before it restores data using the data on the extent at the location SP and the data on the extent at the location SQ, the disk where the extent at the location SP is located is recovered from failure. In this case, the extents corresponding to the virtual mapping information item 701 and the virtual mapping information item 703 are both capable of reading and writing normally. At this time, the value of the variable currentP is still the serial number R corresponding to the virtual mapping information item 703. However, the value of the variable primaryP is varied with the data restoring condition. Therefore, the storage system 100 may restore the data in the stripe 120-1, in response to the failed disk recovering from failure, and based on the mapping information in the virtual mapping information item 701 and the virtual mapping information item 703.

In some embodiments, the storage system 100 (for example, the mapper 130) may determine, from the virtual mapping information item 701 and the virtual mapping information item 703, a virtual mapping information (which is also referred to as "primary mapping information" herein) corresponding to a target extent for copying data during data restoring, and a virtual mapping information (which is also referred to as "secondary mapping information" herein) corresponding to a source extent for copying data during data restoring. Then, the data in the extent corresponding to the secondary mapping information are merged into the extent corresponding to the primary mapping information. After data merging is completed, the secondary mapping information is removed.

For example, in the embodiment as shown in FIG. 7, the mapping information in the virtual mapping information item 701 is determined as the primary mapping information, and correspondingly, the mapping information in the virtual mapping information item 703 is determined as the secondary mapping information. During data migration, the data in the extent located at SR are merged into the extent located at SP Subsequently, information in the virtual mapping information item 703 is removed. In this way, the storage system 100 completes data restoring, and releases the useless virtual mapping information item. Since the extent corresponding to SQ in the virtual mapping information item 702 is located on the failed disk, in order to further release a useless virtual mapping information item, the information in the virtual mapping information item 702 may also be removed.

In some embodiments, in order to reduce the data migration amount and thus improve the data restoring speed, the storage system 100 (for example, the mapper 130) may compare the data amounts in the first extent (i.e., the extent corresponding to SP) and the second extent (i.e., the extent corresponding to SR), using the mapping information item recorded previously (i.e., the virtual mapping information item 701 or the virtual mapping information item 703) providing the location based on which particular data are written. Thereafter, the storage system 100 (for example, the mapper 130) determines the primary mapping information and the secondary mapping information based on the above comparison result.

In light of the foregoing description, the mapper 130 records that the data are written based on the location provided by the virtual mapping information 701 or the virtual mapping information item 703. The mapper 130 may determine the data amount written based on the virtual mapping information item 701 and the data amount written based on the virtual mapping information item 703, respectively, using the recorded information, and then execute the above comparison.

For example, as shown in FIG. 7, through comparison, the mapper 130 determines that the data amount written based on the virtual mapping information item 701 exceeds the data amount written based on the virtual mapping information item 703, then the mapping information in the virtual mapping information item 701 is determined as the primary mapping information. Correspondingly, the mapping information in the virtual mapping information item 703 is determined as the secondary mapping information. At this time, the value of the variable currentP is still the serial number R corresponding to the virtual mapping information item 703. However, the value of the variable primaryP is the serial number P corresponding to the virtual mapping information item 701.

Thereafter, the data in the extent corresponding to SR are merged into the extent corresponding to SP After data merging is completed, the virtual mapping information item 703 is removed. Moreover, since the information recorded in the virtual mapping information item 702 is not useful any longer in the case, the virtual mapping information item 702 may also be removed. Moreover, in the mapping information block 500, only the mapping information item 502 which corresponds to the virtual mapping information item 701 is retained while the contents in the mapping information items 501 and 503 are removed. As an example, the above data merging procedure includes copying data from the extent corresponding to the secondary mapping information to the extent corresponding to the primary mapping information. In addition, the mapper 130 modifies both the values of the variables currentP and primaryP to P, and modifies the value of the variable bitmask to 0x00.

Contrary to the above example, if the mapper 130 determines, through comparison, that the data amount written based on the virtual mapping information item 703 exceeds the data amount written based on the virtual mapping information item 701, the mapping information in the virtual mapping information item 703 is determined as the primary mapping information. Correspondingly, the mapping information in the virtual mapping item 701 is determined as the secondary mapping information. At this time, the value of the variable currentP is still the serial number R corresponding to the virtual mapping information item 703. The value of the variable primaryP is the serial number R corresponding to the virtual mapping information item 703 as well.

Thereafter, the data in the extent corresponding to SP are merged into the extent corresponding to SR. After data merging is completed, the virtual mapping information item 701 is removed. Moreover, since the information recorded in the virtual mapping information item 702 is not useful any longer in the case, the virtual mapping information item 702 may also be removed. Moreover, in the mapping information block 500, only the mapping information item 501 which corresponds to the virtual mapping information item 703 is retained while the contents in the mapping information items 502 and 503 are removed. As an example, the above data merging procedure includes copying data from the extent corresponding to the secondary mapping information to the extent corresponding to the primary mapping information. In addition, the mapper 130 modifies both the values of the variables currentP and primaryP to R, and modifies the value of the variable bitmask to 0x00.

From the above description, it can be seen that the method of data restoring provided in the embodiments of the present disclosure includes a data amount comparison procedure prior to data migration, and thus can effectively reduce the data amount to be migrated and improve the data restoring efficiency accordingly. For example, in a special example, after the virtual mapping information items 702 and 703 are generated, the storage system 100 does not execute any data write operation. As such, in the subsequent data restoring operation, no actual data migration occurs, but only the corresponding variables are modified by the mapper 130.

Figure 8:
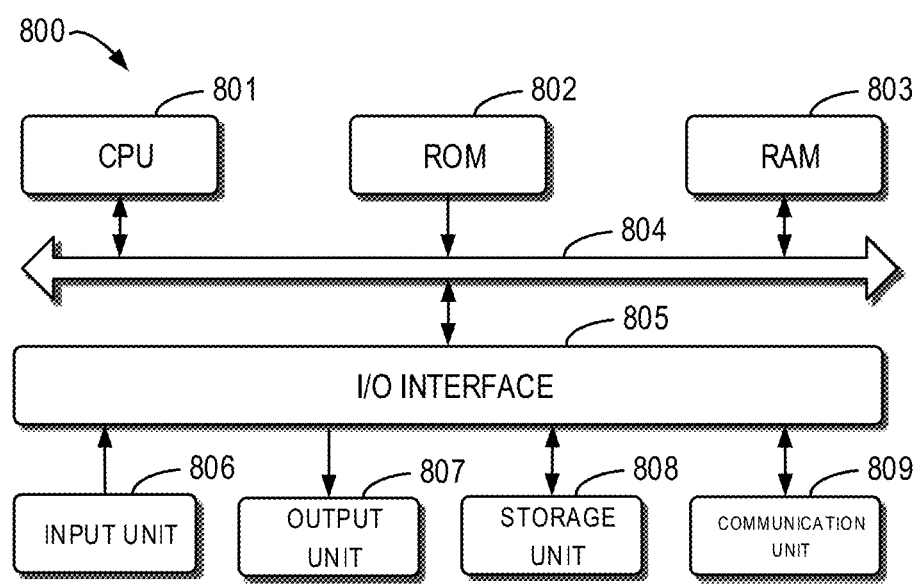
FIG. 8 illustrates a schematic block diagram of an example device that can be used to implement an embodiment of the present disclosure.

FIG. 8 illustrates a schematic block diagram of an example device 800 that can be used to implement an embodiment of the present disclosure. For example, a part of the storage system 100 as shown in FIG. 1 can be implemented by the device 800. As shown in FIG. 8, the device 800 includes a central processing unit (CPU) 801 which can execute various appropriate actions and processing based on computer program instructions stored in a read-only memory (ROM) 802 or computer program instructions loaded from a storage unit 808 into a random access memory (RAM) 803. The RAM 803 also stores therein various programs and data required for operations of the device 800. The CPU 801, the ROM 802 and the RAM 803 are connected via a bus 804 with one another. An input/output (I/O) interface 805 is also connected to the bus 804.

A plurality of components in the device 800 are connected to the I/O interface 805, including: an input unit 806, such as a keyboard, a mouse and the like; an output unit 807, such as various types of displays, loudspeakers, etc.; a storage unit 808, such as a magnetic disk, an optical disk, and etc.; and a communication unit 809, such as a network card, a modem, and a wireless communication transceiver, etc. The communication unit 809 allows the device 800 to exchange information/data with other devices through a computer network such as Internet and/or various kinds of telecommunications networks.

Each procedure and processing described above, e.g., the method 200, may be executed by the processing unit 801. For example, in some embodiments, the method 200 may be implemented as a computer software program that is tangibly included in a machine readable medium, e.g., the storage unit 808. In some embodiments, the computer programs may be partially or completely loaded and/or installed onto the device 800 via ROM 802 and/or the communication unit 809. If the computer program is loaded to the RANI 803 and executed by the CPU 801, one or more steps of the method 200 as described above may be executed.

The present disclosure may be a method, a device, a system, and/or a computer program product. The computer program product may include a computer readable storage medium loaded with computer readable program instructions thereon for executing a processor to carry out various aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means (e.g., specialized circuitry) for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing a Redundant Array of Independent Disks (RAID), comprising:

in response to a stripe in the RAID being established, generating first mapping information of the stripe in mapping information block allocated for the stripe, the RAID being built based on a plurality of extents obtained by dividing a plurality of disks, the stripe including a first set of extents in the plurality of extents, the first mapping information recording respective locations on the plurality of disks of the first set of extents;

in response to a failure occurring in a first disk where a first extent in the first set of extents is located, replacing the first extent in the first set of extents with a second extent in the plurality of extents to obtain a second set of extents corresponding to the stripe;

generating second mapping information of the stripe in the mapping information block, to record respective locations on the plurality of disks of the second set of extents; and in response to the first disk being recovered from the failure, restoring data in the stripe based on the first mapping information and the second mapping information in the mapping information block.

2. The method of claim 1, wherein replacing the first extent with the second extent comprises:

selecting, from the plurality of extents, the second extent located on a second disk in the plurality of disks, the second disk being different from the first disk; and replacing the first extent with the second extent selected.

3. The method of claim 1, wherein the first set of extents are located on a first set of disks in the plurality of disks, and replacing the first extent with the second extent comprises:
selecting, from the plurality of extents, the second extent located on a second disk in the plurality of disks, the second disk being different from the first set of disks; and
replacing the first extent with the second extent selected.

4. The method of claim 1, wherein the first mapping information records a first location on the plurality of disks of the first extent, and generating the second mapping information comprises:
determining a second location on the plurality of disks of the second extent; and
generating the second mapping information by updating the first location recorded in the first mapping information with the second location.

5. The method of claim 1, wherein restoring data in the stripe comprises:
determining primary mapping information and secondary mapping information from the first mapping information and the second mapping information;
merging data in an extent corresponding to the secondary mapping information into an extent corresponding to the primary mapping information; and
in response to the merging being completed, removing the secondary mapping information from the mapping information block.

6. The method of claim 5, wherein determining the primary mapping information and the secondary mapping information comprises:
comparing data amounts in the first extent and the second extent; and
determining the primary mapping information and the secondary mapping information based on the comparison result.

7. The method of claim 6, wherein determining the primary mapping information and the secondary mapping information based on the comparison result comprises:
in response to a data amount in the first extent exceeding a data amount in the second extent, determining the first mapping information as the primary mapping information; and
determining the second mapping information as the secondary mapping information.

8. The method of claim 6, wherein determining the primary mapping information and the secondary mapping information based on the comparison result comprises:
in response to a data amount in the second extent exceeding a data amount in the first extent, determining the second mapping information as the primary mapping information; and
determining the first mapping information as the secondary mapping information.

9. The method of claim 5, wherein merging data in the extent corresponding to the secondary mapping information into the extent corresponding to the primary mapping information comprises:
copying data in the extent corresponding to the secondary mapping information to the extent corresponding to the primary mapping information.

10. A device of managing a Redundant Array of Independent Disks (RAID), comprising:
a processor; and
a memory coupled to the processor and comprising instructions stored therein, the instructions, when executed by the processor, causing the device to execute acts, the acts comprising:
in response to a stripe in the RAID being established, generating first mapping information of the stripe in mapping information block allocated for the stripe, the RAID being built base on a plurality of extents obtained by dividing a plurality of disks, the stripe including a first set of extents in the plurality of extents, the first mapping information recording respective locations on the plurality of disks of the first set of extents;
in response to a failure occurring in a first disk where a first extent in the first set of extents is located, replacing the first extent in the first set of extents with a second extent in the plurality of extents to obtain a second set of extents corresponding to the stripe;
generating second mapping information of the stripe in the mapping information block, to record respective locations on the plurality of disks of the second set of extents; and
in response to the first disk failed being recovered from the failure, restoring data in the stripe based on the first mapping information and the second mapping information in the mapping information block.

11. The device of claim 10, wherein replacing the first extent with the second extent comprises:
selecting, from the plurality of extents, the second extent located on a second disk in the plurality of disks, the second disk being different from the first disk; and
replacing the first extent with the second extent selected.

12. The device of claim 10, wherein the first set of extents are located on a first set of disks in the plurality of disks, and replacing the first extent with the second extent comprises:
selecting, from the plurality of extents, the second extent located on a second disk in the plurality of disks, the second disk being different from the first set of disks; and
replacing the first extent with the second extent selected.

13. The device of claim 10, wherein the first mapping information records a first location on the plurality of disks of the first extent, and generating the second mapping information comprises:
obtaining the first mapping information recording a first location on the plurality of disks of the first extent;
determining a second location on the plurality of disks of the second segment; and
generating the second mapping information by updating the first location recorded in the first mapping information with the second location.

14. The device of claim 10, wherein restoring data in the stripe comprises:
determining primary mapping information and secondary mapping information from the first mapping information and the second mapping information;
merging data in an extent corresponding to the secondary mapping information into an extent corresponding to the primary mapping information; and
in response to the merging being completed, removing the secondary mapping information from the mapping information block.

15. The device of claim 14, wherein determining the primary mapping information and the secondary mapping information comprises:
comparing data amounts in the first extent and the second extent; and determining the primary mapping information and the secondary mapping information based on the comparison result.

16. The device of claim 15, wherein determining the primary mapping information and the secondary mapping information, based on the comparison result comprises:

in response to a data amount in the first extent exceeding a data amount in the second extent, determining the first mapping information as the primary mapping information; and determining the second mapping information as the secondary mapping information.

17. The device of claim 15, wherein determining the primary mapping information and the secondary mapping information, based on the comparison result comprises:

in response to a data amount in the second extent exceeding a data amount in the first extent, determining the second mapping information as the primary mapping information; and determining the first mapping information as the secondary mapping information.

18. The device of claim 14, wherein merging data in the extent corresponding to the secondary mapping information into the extent corresponding to the primary mapping information comprises:

copying data in the extent corresponding to the secondary mapping information to the extent corresponding to the primary mapping information.

19. A computer program product having a non-transitory computer readable medium which stores a set of instructions to manage a Redundant Array of Independent Disks (RAID); the set of instructions, when carried out by computerized circuitry, causing the computerized circuitry to perform a method of:

in response to a stripe in the RAID being established, generating first mapping information of the stripe in mapping information block allocated for the stripe, the RAID being built based on a plurality of extents obtained by dividing a plurality of disks, the stripe including a first set of extents in the plurality of extents, the first mapping information recording respective locations on the plurality of disks of the first set of extents;

in response to a failure occurring in a first disk where a first extent in the first set of extents is located, replacing the first extent in the first set of extents with a second extent in the plurality of extents to obtain a second set of extents corresponding to the stripe;

generating second mapping information of the stripe in the mapping information block, to record respective locations on the plurality of disks of the second set of extents; and in response to the first disk being recovered from the failure, restoring data in the stripe based on the first mapping information and the second mapping information in the mapping information block.

* * * * *